(12) United States Patent
Bouygues et al.

(10) Patent No.: US 12,090,539 B2
(45) Date of Patent: Sep. 17, 2024

(54) QUICK-COUPLING PANEL STRAIGHTENING DEVICE

(71) Applicant: GYS, Saint-Berthevin (FR)

(72) Inventors: Bruno Bouygues, Paris (FR); Mickael Gabillard, Montigné le brillant (FR); David Manceau, Cossé le vivien (FR)

(73) Assignee: GYS, Saint-Berthevin (FR)

( * ) Notice: Subject to any disclaimer, the term of this patent is extended or adjusted under 35 U.S.C. 154(b) by 0 days.

(21) Appl. No.: 18/167,470

(22) Filed: Feb. 10, 2023

(65) Prior Publication Data

US 2023/0256492 A1    Aug. 17, 2023

(30) Foreign Application Priority Data

Feb. 11, 2022    (FR) ........................................ 2201199

(51) Int. Cl.
    *B21D 1/14*    (2006.01)
    *B21D 1/06*    (2006.01)

(52) U.S. Cl.
    CPC ............... *B21D 1/145* (2013.01); *B21D 1/06* (2013.01)

(58) Field of Classification Search
    CPC .................................... B21D 1/06; B21D 1/14
    See application file for complete search history.

(56) References Cited

U.S. PATENT DOCUMENTS

| | | | | |
|---|---|---|---|---|
| 4,930,335 A | * | 6/1990 | Ishihara | ................... B21D 1/06 72/705 |
| 5,131,257 A | * | 7/1992 | Mingardi | ............. B25H 1/0007 72/457 |
| 2003/0101791 A1 | * | 6/2003 | Ritter | ....................... B21D 1/06 72/705 |
| 2005/0076700 A1 | * | 4/2005 | Venalainen | ............. B21D 1/06 72/705 |
| 2007/0056349 A1 | | 3/2007 | Knowles | |

FOREIGN PATENT DOCUMENTS

| | | |
|---|---|---|
| CN | 102921772 A | 2/2013 |
| CN | 106881558 A | 6/2017 |
| DE | 102019125136 A1 | 3/2021 |

OTHER PUBLICATIONS

French Search Report and Written Opinion dated Sep. 28, 2022 for corresponding French Application No. 2201199, filed Feb. 11, 2022.
English translation of Written Opinion of the French Searching Authority dated Sep. 28, 2022 for corresponding French Application No. 2201199, filed Feb. 11, 2022.

* cited by examiner

*Primary Examiner* — Teresa M Ekiert
(74) *Attorney, Agent, or Firm* — David D. Brush; Westman, Champlin & Koehler, P.A.

(57) ABSTRACT

A panel straightening device including a bar supporting a draw rod movably mounted on the bar and an element for controlling the movement of the draw rod in relation to the bar. The draw rod includes at one of the ends thereof a first attachment feature to a tool for drawing the panel to be straightened. The drawing tool includes a second attachment feature, capable of cooperating with the first attachment feature of the draw rod. The first attachment features is connected to the second attachment feature by a sliding pivot connection.

10 Claims, 4 Drawing Sheets

[Fig 1]
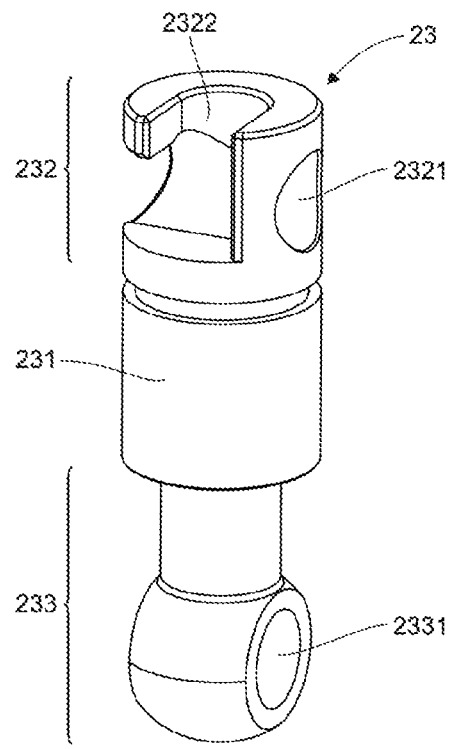
[Fig 2]
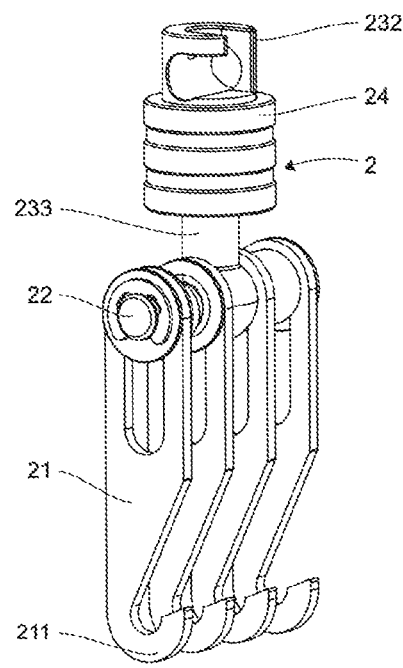

[Fig 3]
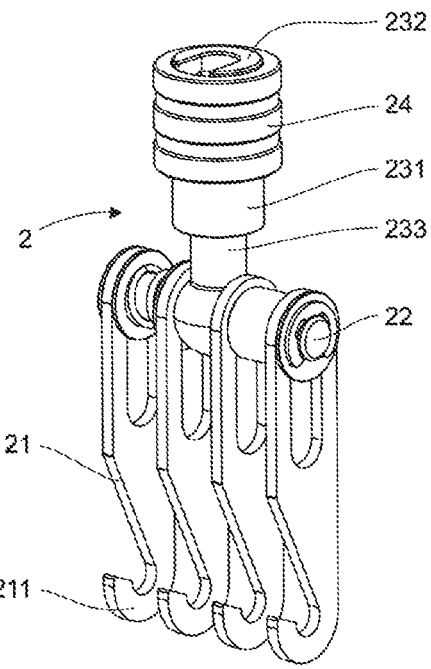
[Fig 4]
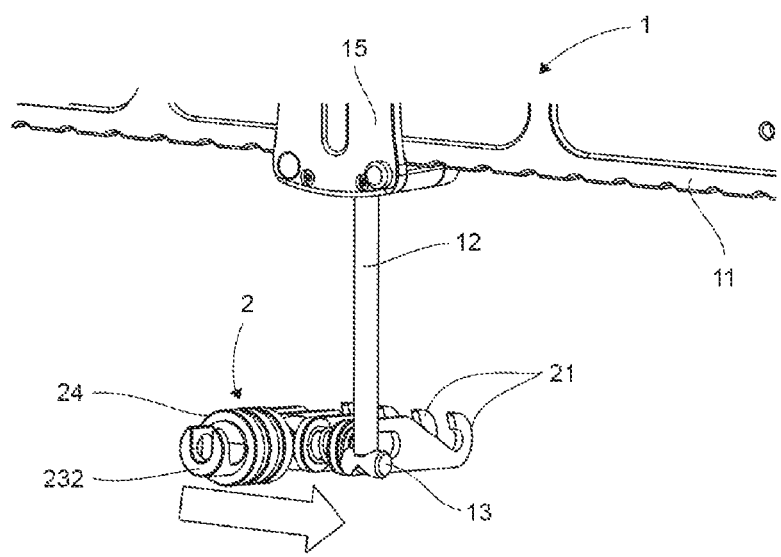

[Fig 5]
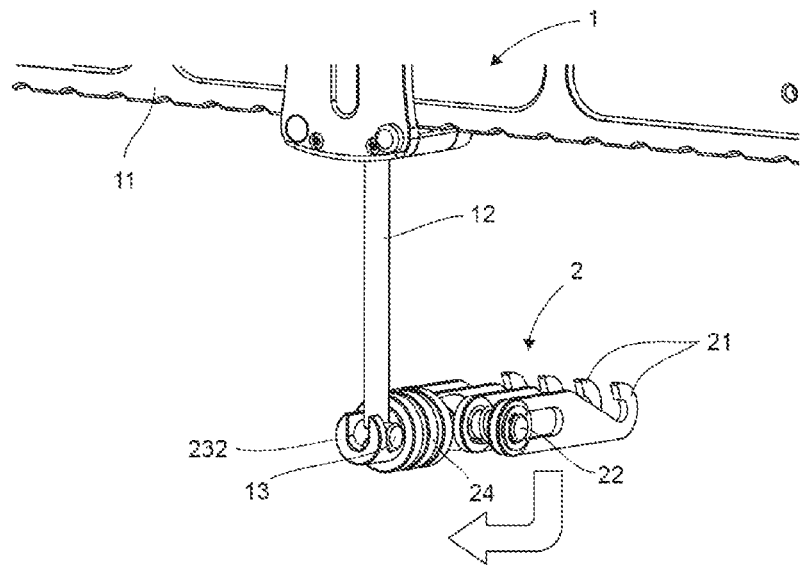
[Fig 6]
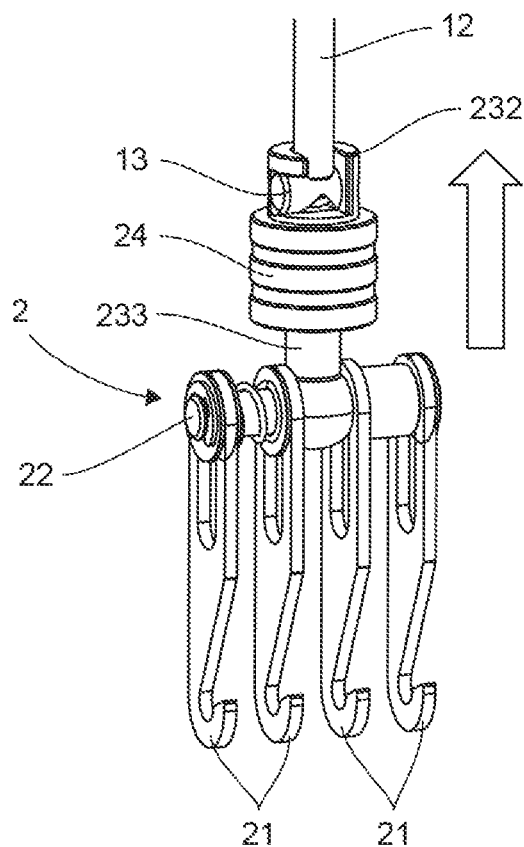

[Fig 7]
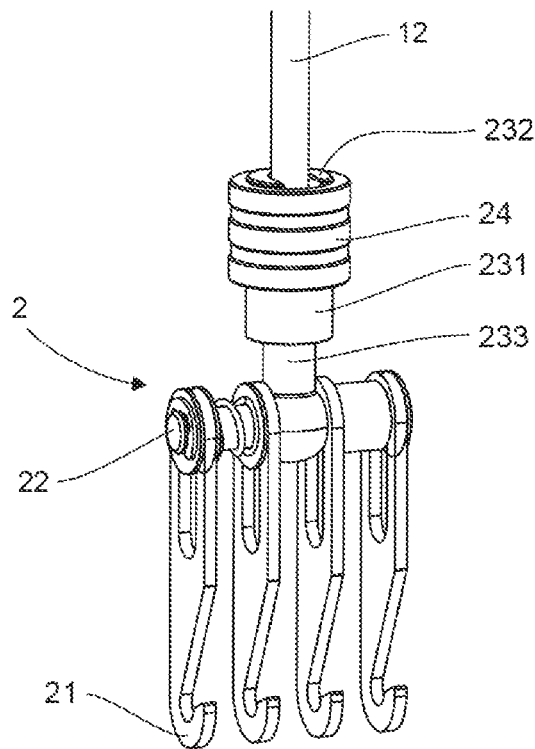
[Fig 8]
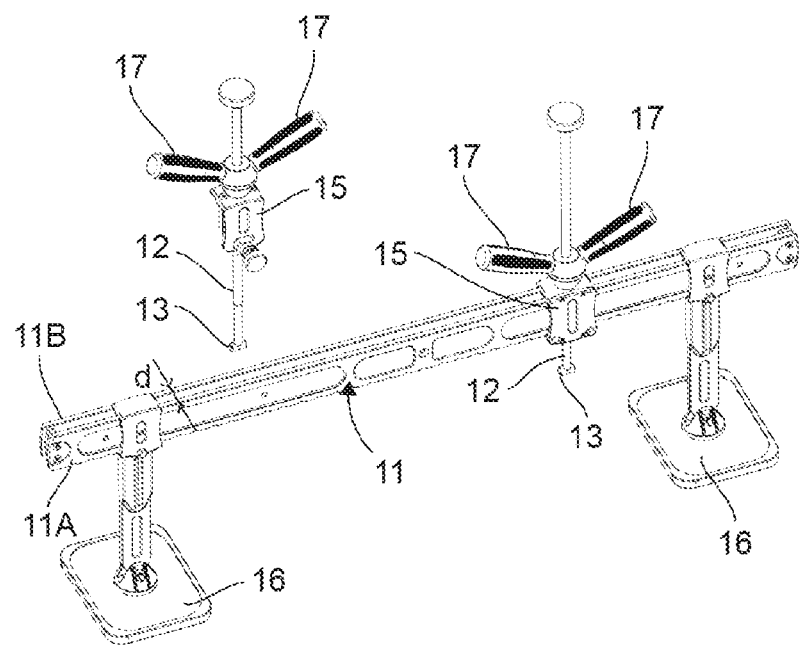

QUICK-COUPLING PANEL STRAIGHTENING DEVICE

1. FIELD OF THE INVENTION

The present invention relates to panel straightening devices, and more specifically devices intended to straighten and reshape vehicle bodies which have been dented following a shock or an accident for example.

2. PRIOR ART

Manual straightening devices are known, enabling the repair of automotive body dents and which comprise a bar provided at the two ends thereof with pads intended to bear upon the body. A central draw rod is slidably mounted in translation on the bar and can be moved by two pivoting levers which the operator can actuate. The draw rod is adapted by one of the ends thereof to be connected to a drawing tool comprising spaced-apart draw elements (hooks or claws) mounted on a draw shaft. Conventionally, the drawing tool is screwed onto a threading disposed at the end of the bar rod, as described in the documents US 2007/056 349 A1 and CN 106 881 558 A, for example.

According to a process routinely used by automotive body repairers, hooks which are connected to the draw elements are temporarily welded onto the dented panel. On actuating the two levers, the draw rod is raised and the draw elements then apply via the hooks a tensile force to the vehicle body to reshape it.

Such a device generally gives satisfactory results, but if the drawing tool is not screwed on properly, the threading of the bar rod may be damaged under the effect of a substantial drawing force. Moreover, the screwed fitting of the drawing tool is time-consuming.

3. DESCRIPTION OF THE INVENTION

To this end, the invention proposes a panel straightening device comprising a bar supporting a draw rod movably mounted on the bar and means for controlling the movement of the draw rod in relation to the bar, the draw rod comprising at one of the ends thereof first attachment means to a tool for drawing the panel to be straightened, the drawing tool comprising second attachment means, capable of cooperating with said first attachment means of the draw rod, the first attachment means being connected to the second attachment means by a sliding pivot connection.

The invention thus proposes a manual straightening device suitable for use in automotive body repair workshops which comprises a dent removal bar coupling system using a reversible/removable connection, of the sliding pivot type with two degrees of freedom. This coupling system is quick to set up and requires no tools, unlike the screwed connection of the prior art (helical connection with a single degree of mobility).

According to a specific implementation of the invention, said first attachment means consist of a cylindrical pin and the second attachment means consist of an end piece wherein the cylindrical pin is housed.

According to another specific implementation of the invention, said second attachment means consist of a cylindrical pin and the first attachment means consist of an end piece wherein the cylindrical pin is housed.

According to a specific aspect of the invention, the end piece comprises a bore for receiving the cylindrical pin and a groove for inserting the draw rod extending perpendicularly to the bore. According to a specific aspect of the invention, the drawing tool or the draw rod comprises means for locking/unlocking the connection between the first attachment means and the second attachment means.

Preferably, the drawing tool bears a sliding ring for locking/unlocking the connection between the first attachment means and the second attachment means.

According to a specific implementation of the invention, the bar comprises two profiles disposed in parallel so as to define therebetween an empty space of predetermined width, the diameter of the pin being less than the predetermined width.

Advantageously, the draw rod is supported by a carriage slidably mounted on the bar.

The invention also relates to a drawing tool intended to be used in a panel straightening device according to one of the preceding claims, said device comprising a draw rod having first attachment means, the drawing tool having second attachment means, capable of cooperating with said first attachment means of the draw rod, the second attachment means being intended to be connected to the first attachment means by a sliding pivot connection.

4. LIST OF FIGURES

Further features and advantages of the invention will become apparent on reading the following description of a specific embodiment, given merely by way of illustrative and non-limiting example, and the appended drawings, wherein:

FIG. 1 is a perspective view of the body of a drawing tool adapted for use in a panel straightening device according to the invention;

FIG. 2 is a perspective view of a drawing tool adapted for use in a panel straightening device according to the invention, the drawing tool being provided with a locking/unlocking ring which is here in the unlocked position;

FIG. 3 is a perspective view of the drawing tool in [FIG. 2], the locking/unlocking tool being here in the locked position;

FIG. 4 is a perspective view of the draw rod and the drawing tool before assembly;

FIG. 5 shows the pin of the draw rod inserted into the end piece of the drawing tool before rotation thereof;

FIG. 6 shows the pin of the draw rod inserted into the end piece of the drawing tool after rotation thereof, the locking/unlocking ring being in the unlocked position;

FIG. 7 shows the pin of the draw rod inserted into the end piece of the drawing tool after rotation thereof, the locking/unlocking ring being in the locked position;

FIG. 8 is a perspective view of a panel straightening device according to the invention.

5. DESCRIPTION OF AN EMBODIMENT OF THE INVENTION

With reference to FIGS. 1 to 8, an embodiment of a manual straightening device for repairing automotive body dents is described hereinafter.

This straightening device 1, which can be seen in FIG. 8 and is partially represented in FIGS. 4 and 5, comprises in a known manner a so-called dent removal or drawing bar 11 provided at the two ends thereof with pads 16 intended to bear on the body. A central draw rod 12 is slidably mounted in translation on the bar 11, perpendicularly thereto, and can be moved by two pivoting levers 17 which the operator can actuate. The draw rod 12 is borne by a carriage 15 which can be moved manually along the drawing bar 11.

The straightening device 1 illustrated in FIG. 8 uses a double draw bar, whereon two removable carriages 13 can be placed (a single drawing carriage or three drawing carriages can be placed on such a bar as a general rule).

The width of the through hollow space between the two profiles 11A, 11B forming the drawing bar 11 is referenced "d".

Drawing is performed using two levers as illustrated in FIG. 8. In an alternative embodiment not illustrated, the draw rod is threaded and it is moved by a rotary wheel body. It should be noted that the invention also applies to straightening devices using a single drawing bar.

The draw rod 12 is adapted by one of the ends thereof to be connected to a drawing or draw tool 2 comprising spaced-apart draw elements (hooks) 21 mounted on a draw shaft 22.

Advantageously, the drawing tool 2 is assembled on a tool-holder mount 13 disposed at the free end of the draw rod 12 of the bar 11. The tool-holder mount 13 takes the form of a cylindrical axis/pin extending perpendicularly to the draw rod 12.

As illustrated in FIG. 1, the drawing tool 2 comprises a body 23 presented in the form of a rod and comprises a cylindrical central part 231. At one end of this central part 231, there is a first cylindrical end piece or sleeve 232 and at the opposite end, there is a second end piece 233 wherein a bore 2331 for inserting the draw shaft 22, the bore 2331 extending perpendicularly to the longitudinal axis of the body 23. As illustrated in FIGS. 2 and 3, a locking/unlocking ring 25 is slidably mounted on the body 23 between an unlocking position (where it surrounds the central part 231) and a locking position (where it surrounds the end piece 232 and a portion of the central part 231). The hollow end piece 232 has a diametrically arranged bore 2321 which extends perpendicularly to the longitudinal axis of the body 23 (FIG. 1). The end piece 232 also has a groove 2322 perpendicular to the bore 241 (and therefore parallel with the longitudinal axis of the body 23).

The draw elements 21, which are all identical and four in number in the embodiment illustrated, contain a finger or claw 211 in the area of the opposite end thereof to the draw shaft 22.

The fingers 211 are engaged on a rod inserted through rings (not shown) which are welded temporarily onto the panel that is dented/to be straightened. On actuating the two levers of the straightening device 1, or the rotary wheel body when the draw rod is threaded, the draw rod 12 is raised and the draw elements 21 then apply via the hooks a tensile force to the vehicle body to reshape it.

The quick assembly of the drawing tool 2 on the draw rod 12 of the straightening device 1 is detailed hereinafter.

As illustrated in FIGS. 4 to 7, the end piece 232 of the drawing tool 2 is positioned near the pin of the draw rod 12 acting as the tool-holder mount 13 (FIG. 4).

The pin acting as a tool-holder mount 13 is then inserted into the bore 2321 of the end piece 232 (FIG. 5). The drawing tool 2 is then pivoted about the pin axis acting as a tool-holder mount 13 (arrow in FIG. 5) such that the drawing tool 2 is located in line with the draw rod 12 (FIG. 6).

During this rotation, the draw rod 12 is positioned in the groove 2322 of the end piece 232, the pin acting as the tool-holder mount 13 remaining positioned in the bore 2321 of the end piece 232.

This quick assembly is therefore carried out in two stages, by sliding the end piece 232 acting as the female element (second attachment means) on the pin acting as the male element (first attachment means), then pivoting the end piece 232 about the pin.

The sliding locking/unlocking ring 25 is then raised (arrow in FIG. 6) so that it is positioned about the end piece 232 so as to lock or block the pin and the end piece 232 in the engaged position (FIG. 7). The sliding ring is locked by a seal inside the ring, which locks it in position by friction. Once this assembly operation has been performed, the straightening device according to the invention is placed on a spot on the panel next to the dent and makes it possible to reshape dented panels by drawing as described above.

This dent removal bar coupling system uses a reversible/removable connection, of the sliding pivot type with two degrees of freedom, which is quick and requires no tools, unlike the screwed connection of the prior art (helical connection with a single degree of mobility).

The fastening of the drawing tool is also very robust. It is compatible with the use of a single drawing bar, and also a double drawing bar whereon removable carriages can be added (up to two or three drawing carriages can be placed on a bar).

In the example illustrated in FIG. 8, the size of the pin acting as a tool-holder mount 13 is selected so as to be able to fit through the double straightening or drawing bar, which enables the use of removable drawing carriages, which can be easily placed on or removed from the bar. The diameter of the pin acting as a mount 13 is here less than the distance "d" between the two profiles 11A, 11B acting as a double drawing bar, which makes it possible to insert this pin between the profiles to place the carriage 15 on the double bar.

In a further embodiment of the invention, the draw rod can bear female attachment means and the drawing tool can bear male attachment means.

It should moreover be noted that the quick coupling system may not use a locking/unlocking ring or may use another device for locking/unlocking the connection between the draw rod and the drawing tool.

These locking/unlocking means may be used on the drawing tool or on the draw rod, or both if they are in two parts.

The invention claimed is:

1. A panel straightening device comprising:
   a drawing tool; and
   a bar supporting a draw rod movably mounted on the bar; and
   the draw rod comprising at one end thereof a first attachment element, said drawing tool comprising a second attachment element, which cooperates with said first attachment element, the first attachment element being connected to the second attachment element by a sliding pivot connection,
   wherein the drawing tool or the draw rod comprises a lock having a locking position and an unlocking position for locking and unlocking, respectively, the connection between the first attachment element and the second attachment element.

2. The panel straightening device according to claim 1, wherein said first attachment element comprises a cylindrical pin and the second attachment element comprises an end piece wherein the cylindrical pin is housed.

3. The panel straightening device according to claim 2, wherein the end piece comprises a bore for receiving the cylindrical pin and a groove for inserting the draw rod extending perpendicularly to the bore.

4. The panel straightening device according to claim 1, wherein said second attachment element comprises a cylindrical pin and the first attachment element comprises an end piece wherein the cylindrical pin is housed.

5. The panel straightening device according to claim 4, wherein the end piece comprises a bore for receiving the cylindrical pin and a groove for inserting the draw rod extending perpendicularly to the bore.

6. The panel straightening device according to claim 4, wherein the bar comprises first and second profiles disposed in parallel so as to define an empty space therebetween of predetermined width, wherein the pin has a diameter that is less than the predetermined width.

7. The panel straightening device according to claim 1, wherein the lock comprises a sliding ring for locking/unlocking the connection between the first attachment element and the second attachment element.

8. The panel straightening device according to claim 1, wherein the draw rod is supported by a carriage slidably mounted on the bar.

9. A drawing tool usable in a panel straightening device, said panel straightening device comprising a draw rod movably mounted on a bar, the draw rod comprising at one end thereof a first attachment element, the drawing tool comprising:

a second attachment element, which cooperates with said first attachment element of the draw rod, the second attachment element being connectable to the first attachment element by a locking sliding pivot connection, wherein the drawing tool comprises at least a portion of a lock having a locking position and an unlocking position for locking and unlocking, respectively, the connection between the first attachment element and the second attachment element.

10. A panel straightening device comprising:

a drawing tool; and a bar supporting a draw rod movably mounted on the bar; and the draw rod comprising at one end thereof a first attachment element, said drawing tool comprising a second attachment element, which cooperates with said first attachment element, the first attachment element being connected to the second attachment element by a sliding pivot connection, wherein one of the first attachment element or the second attachment element comprises a cylindrical pin and the other of the first attachment element or the second attachment element comprises an end piece wherein the cylindrical pin is housed.

\* \* \* \* \*